United States Patent
Byun et al.

(10) Patent No.: US 8,232,000 B2
(45) Date of Patent: Jul. 31, 2012

(54) RECHARGEABLE BATTERY WITH TERMINAL JUNCTION AND PRONG

(75) Inventors: Sang-Won Byun, Yongin-si (KR); Yong-Sam Kim, Yongin-si (KR); Seok-Yoon Yoo, Yongin-si (KR); Young-Bong Choi, Yongin-si (KR); Sang-Jin Park, Yongin-si (KR)

(73) Assignee: SB Limotive Co., Ltd., Yongin-si (KR)

( * ) Notice: Subject to any disclaimer, the term of this patent is extended or adjusted under 35 U.S.C. 154(b) by 0 days.

(21) Appl. No.: 12/837,212

(22) Filed: Jul. 15, 2010

(65) Prior Publication Data

US 2011/0171516 A1 Jul. 14, 2011

Related U.S. Application Data

(60) Provisional application No. 61/294,380, filed on Jan. 12, 2010.

(51) Int. Cl.
*H01M 2/26* (2006.01)

(52) U.S. Cl. ......... 429/161; 429/149; 429/160; 429/211

(58) Field of Classification Search .................. 429/161, 429/149, 160, 211
See application file for complete search history.

(56) References Cited

U.S. PATENT DOCUMENTS

| | | | |
|---|---|---|---|
| 2006/0051664 A1* | 3/2006 | Tasai et al. | 429/161 |
| 2007/0009793 A1 | 1/2007 | Kim et al. | |
| 2010/0203371 A1* | 8/2010 | Nagai et al. | 429/94 |

FOREIGN PATENT DOCUMENTS

| | | |
|---|---|---|
| FR | 2 625 372 | 6/1989 |
| GB | 1 503 954 | 3/1978 |
| JP | 2004-273178 | 9/2004 |
| JP | 2006-228551 | 8/2006 |
| KR | 10-2006-0060806 | 6/2006 |
| KR | 10-2009-00811973 | 7/2009 |
| WO | WO 2009013592 A2 * | 1/2009 |

OTHER PUBLICATIONS

European Search Report dated Dec. 3, 2010, for corresponding European Patent application 10177072.5.
Patent Abstracts of Japan and English machine translation of Japanese Publication No. 2006-228551, 10 pages.
European Office action dated Feb. 9, 2012, for corresponding European Patent application 10177072.5, 6 pages.
Patent Abstracts of Japan, and English machine translation of Japanese Publication 2004-273178, listed above, 21 pages.
KIPO Office action dated Mar. 28, 2012, for corresponding Korean Patent application 10-2010-0085018, (5 pages).

\* cited by examiner

*Primary Examiner* — Barbara Gilliam
*Assistant Examiner* — Zachary Best
(74) *Attorney, Agent, or Firm* — Christie, Parker & Hale, LLP

(57) ABSTRACT

A rechargeable battery 100 includes a plurality of electrode assemblies 10; a case 34 housing the electrode assemblies 10; at least one electrode terminal 21, 22, electrically connected to the electrode assemblies 10 by a lead tab 40, 50, the lead tab 50 including a terminal junction part 51; and a prong portion extending from the terminal junction plate, the prong portion comprising a plurality of prongs 53, 54, each of the prongs having a main body 53*a* electrically connected to one of the electrode assemblies 10 and an angled body 53*b* bent at one angle from the main body 53*a*.

16 Claims, 8 Drawing Sheets

RECHARGEABLE BATTERY WITH TERMINAL JUNCTION AND PRONG

CROSS-REFERENCE TO RELATED APPLICATIONS

This application claims the benefit of U.S. Provisional Application No. 61/294,380, filed on Jan. 12, 2010, in the United States Patent and Trademark Office, the disclosure of which is incorporated herein in its entirety by reference.

BACKGROUND

1. Field

The present invention relates to a rechargeable battery and, more particularly, to a rechargeable battery with a current collecting lead tab.

2. Description of the Related Art

Unlike a primary battery, which is not rechargeable, a rechargeable battery can be discharged and recharged. A low-capacity rechargeable battery can be used for small portable electronic devices such as mobile phones, notebook computers, or camcorders, while a large-capacity rechargeable battery can be used as a power source for, for example, a motor for an electric vehicle.

Recently, a high-output rechargeable battery using a non-aqueous electrolyte of high energy density is being developed, and a plurality of high-output rechargeable batteries are connected in series to constitute a large-capacity battery module so as to be used for driving a motor of a device, e.g., an electric automobile or the like, that requires much power.

Also, a single high-output rechargeable battery generally includes a plurality of rechargeable batteries connected in series, and such rechargeable batteries may have a cylindrical type, a prismatic type, and the like.

The prismatic rechargeable battery may include a terminal electrically connected with the electrode assembly enclosed in a case via a current collecting lead tab and protruding from an outer surface of the case.

When a plurality of electrode assemblies are inserted in a single case, the current collecting lead tab needs to be inserted between the electrode assemblies. In this case, however, a space between uncoated regions is so small that the electrode assemblies may be damaged when the current collecting lead tab is inserted. Also, if the current collecting lead tab is attached only to some of the electrode assemblies, the flow path of current is lengthened, which increases resistance and generates much heat.

SUMMARY

Embodiments of the present invention provide a rechargeable battery being easily installable and stably fixed to a plurality of electrode assemblies.

A rechargeable battery includes a plurality of electrode assemblies; a case housing the electrode assemblies; at least one electrode terminal, electrically connected to the electrode assemblies by a lead tab, the lead tab including a terminal junction part; and a prong portion extending from the terminal junction part, the prong portion comprising a plurality of prongs, each of the prongs having a main body electrically connected to one of the electrode assemblies and an angled body bent at one angle from the main body.

In one embodiment, the prong portion further comprises an insertion tip extending from the angled body, wherein the insertion tip is spaced from the one of the electrode assemblies. The insertion tip and the main body may extend in a direction substantially parallel to each other. Further, in one embodiment, the insertion tip extends at an angle from the angled body.

In one embodiment, the terminal junction part has a terminal opening through which the at least one electrode terminal extends. Additionally, a connection plate may extend from an edge of the terminal junction part and the prong portion may extend from the connection plate.

The prong portion may further include a first branch plate extending from the terminal junction part, wherein at least one of the prongs extends from the first branch plate. Additionally, a second branch plate may extend from the terminal junction part, wherein at least one of the prongs extends therefrom.

According to embodiments of the present invention, the main bodies of each of the prongs may extend in a direction substantially parallel to each other and they may be substantially rectangular. Further, the angled body may be bent at an angle in a direction away from the one of the electrode assemblies to which the main body is connected, and the angle may be between about degrees and about degrees.

In one embodiment, the lead tab is configured to electrically connect at least three electrode assemblies to the electrode terminal and the main body is welded to the one of the electrode assemblies.

DESCRIPTION OF REFERENCE NUMERALS INDICATING PRIMARY ELEMENTS IN THE DRAWINGS

Figure 1:
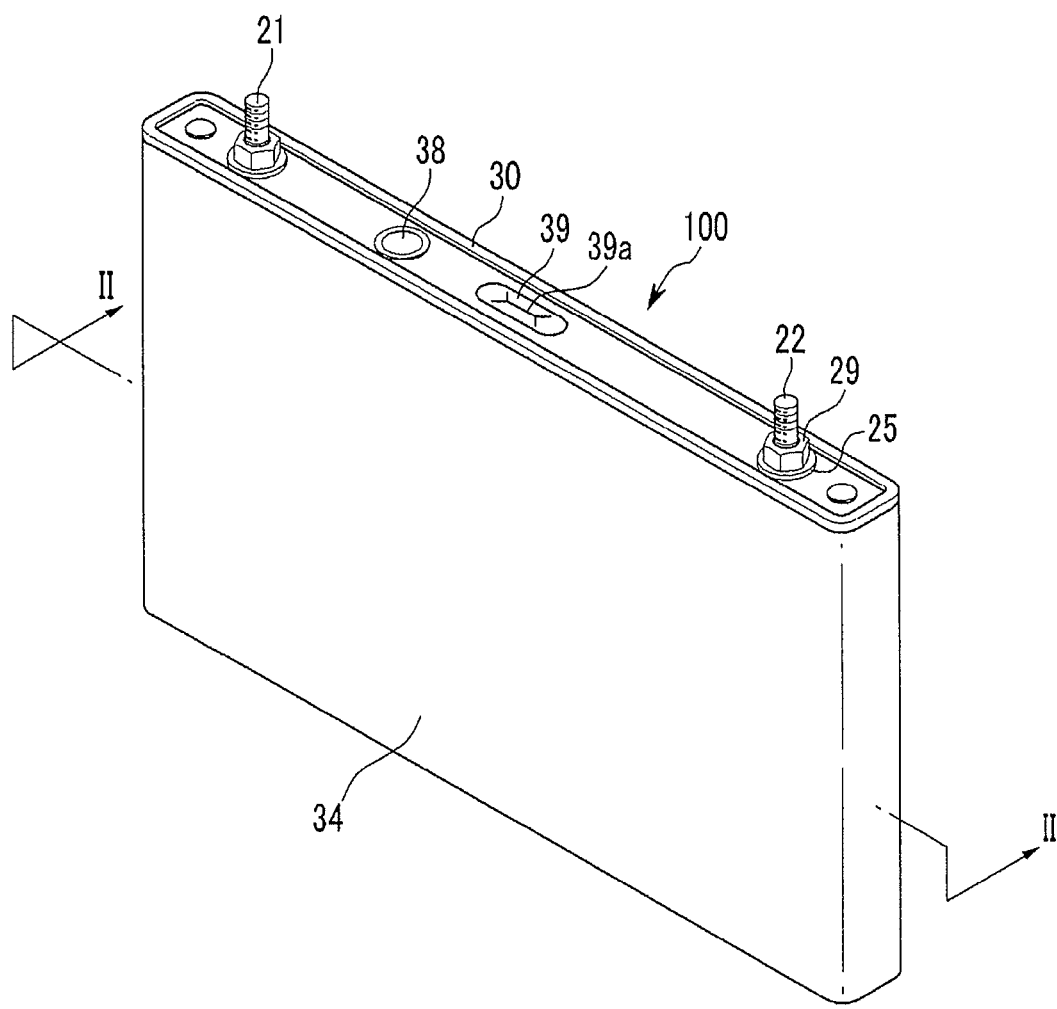
FIG. 1 is a perspective view of a rechargeable battery according to a first exemplary embodiment of the present invention.

| | |
|---|---|
| 100: rechargeable battery | 10: electrode assembly |
| 11: positive electrode | 12: negative electrode |
| 13: separator | 20: cap assembly |
| 21: positive terminal | 22: negative terminal |
| 21a, 22a: flange | 21b, 22b: lower protrusion |
| 30: cap plate | 34: case |
| 40: negative electrode current collecting lead tab | |
| 50: positive current collecting lead tab | |
| 51: terminal junction part | 51a: terminal hole |

-continued

| | |
|---|---|
| 52: connection plate | 53: the first prong |
| 54: the second prong | 53a: welded bar |
| 53b: bent bar | 53c: insertion tip |
| 56: branch portion | |

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The same reference numerals will be used throughout to designate the same or like components.

Figure 2:
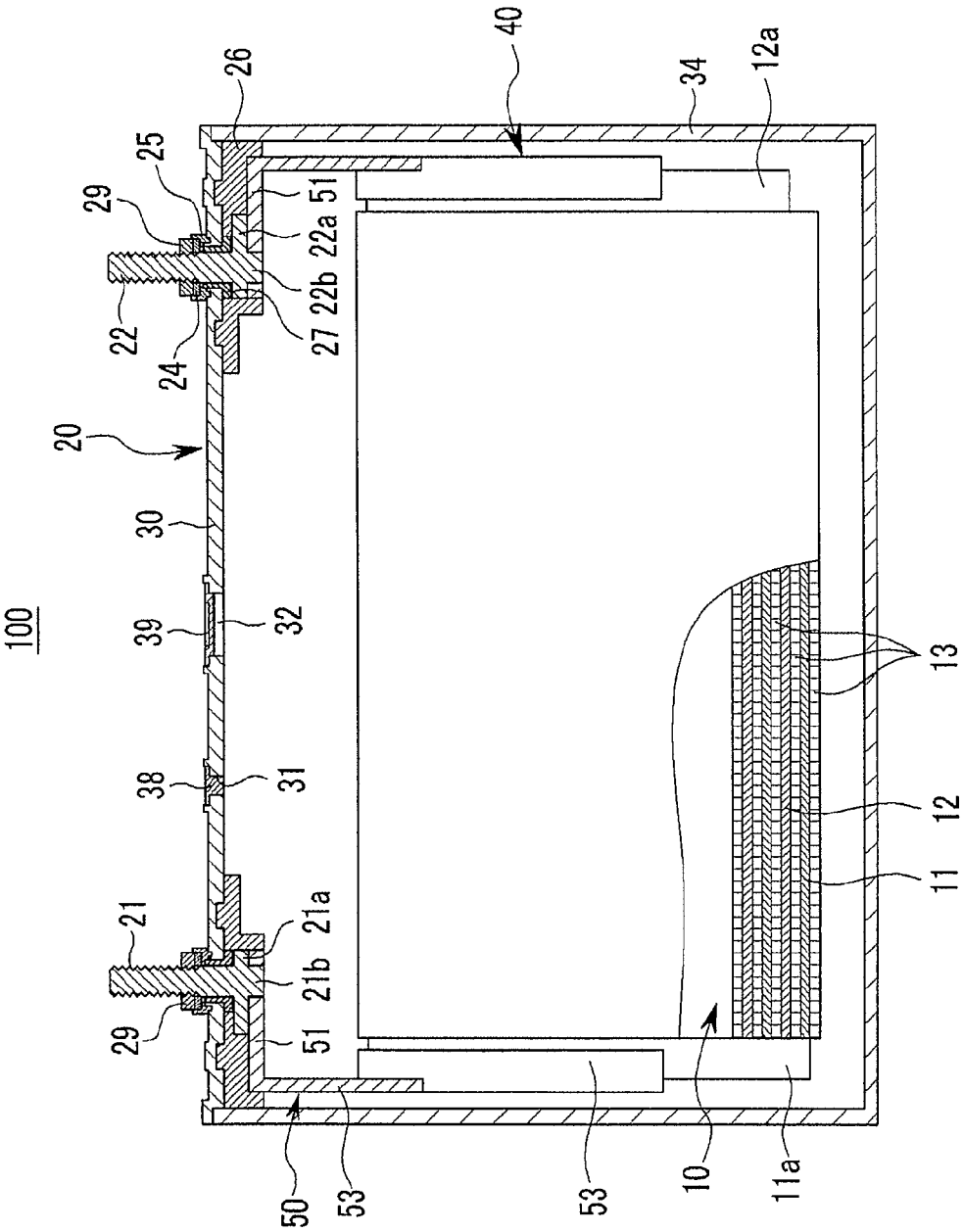
FIG. 2 is a sectional view taken along line II-II in FIG. 1.

FIG. 1 is a perspective view of a rechargeable battery according to a first exemplary embodiment of the present invention, and FIG. 2 is a sectional view taken along line II-II in FIG. 1.

With reference to FIGS. 1 and 2, a rechargeable battery 100 according to the first exemplary embodiment of the present invention includes a plurality of electrode assemblies 10 each wound with a positive electrode 11 and a negative electrode 12 with a separator 13 located therebetween, a case 34 accommodating the electrode assemblies 10 therein, and a cap assembly 20 coupled to an opening of the case 34.

In the first exemplary embodiment, for example, the rechargeable battery 100 is a lithium ion rechargeable battery having a generally rectangular shape. However, without being limited thereto, the present invention may be applicable to various types of batteries such as a lithium polymer battery, a cylindrical battery, and the like.

The positive electrode 11 and the negative electrode 12 include a coated region, i.e., a region formed by coating an active material on a current collector formed as a metal foil, and uncoated regions 11a and 12a of the current collector where an active material is not coated. The positive electrode uncoated region 11a is formed at one side end of the positive electrode 11 along a lengthwise direction of the positive electrode 11, and the negative electrode uncoated region 12a is formed at another side end of the negative electrode 12 along a lengthwise direction of the negative electrode 12. The positive electrode 11 and the negative electrode 12 are wound with the separator 13, an insulator, located therebetween.

However, the present invention is not meant to be limited thereto, and the electrode assemblies 10 may have a structure in which positive and negative electrodes each made up of a plurality of sheets are alternately stacked with a separator interposed therebetween. In the case 34, two electrode assemblies 10 are disposed side by side and electrically connected with terminals 21 and 22. However, the present invention is limited thereto, and a plurality of electrode assemblies 10 may be installed.

The case 34 forms an overall outer appearance of the rechargeable battery 100, and may be made of a conductive metal such as aluminum, an aluminum alloy, or nickel-plated steel. Also, the case 34 provides a space in which the electrode assemblies 10 are installed. For example, the case 34 may have a rectangular parallelepiped shape (namely, a cuboid shape) having an opening formed at one side thereof in order to accommodate (or receive) the electrode assemblies 10 having a shape corresponding to a rectangular parallelepiped. The opening points upward from the case 34 illustrated in FIGS. 1 and 2.

The cap assembly 20 includes a cap plate 30 covering the opening of the case 34, a positive terminal 21 outwardly protruding from the cap plate 30 and electrically connected with the positive electrode 11, and a negative terminal 22 outwardly protruding from the cap plate 30 and electrically connected with the negative electrode 12.

The cap plate 30 is formed as a thin plate, and coupled to the opening of the case 34. A sealing stopper 38 is installed at an electrolyte injection opening 31 of the cap plate 32, and a vent member 39 with a notch 39a is installed at a vent hole 32 such that it can be fractured at a pre-set pressure.

The positive terminal 21 and the negative terminal 22 are installed to penetrate the cap plate 30, flanges 21a and 22a are formed to be supported at a lower portion of the positive terminal 21 and the negative terminal 22, respectively, under the cap plate 30, and outer circumferential surfaces of the upper columns protruding to the outer side of the cap plate 30 are threaded. Nuts 29, supported from an upper side, are fastened to the terminals 21 and 22. Washers 24 for buffering the fastening force of the nuts 29 are installed below the nuts 29.

In the present exemplary embodiment, the terminals 21 and 22 are fixed by the nuts 29, but the present invention is not limited thereto and the terminals 21 and 22 may have a rivet structure or may be fixed through welding.

A lower gasket 27 and an upper gasket 25 are installed between the terminals 21 and 22 and the cap plate 30. The lower gasket 27 is positioned between the flanges 21 and 22 and the cap plate 30, and the upper gasket 25 is positioned between the cap plate 30 and the washer 24.

A positive current collecting lead tab 50 bonded through welding to a positive uncoated region 11a is attached to the positive terminal 21, and a negative current collecting lead tab 40 bonded through welding to the negative uncoated region 12a is attached to the negative terminal 22. The positive current collecting lead tab 50 is attached to the positive uncoated regions 11a of the two electrode assemblies 10, and the negative current collecting lead tab 40 is also attached through welding to the negative uncoated regions 12a of the two electrode assemblies 10.

Lower protrusions 21b and 22b are formed under the flanges 21a and 22a, and the current collecting lead tabs 40 and 50 are fixed to the lower protrusions 21b and 22b through welding. However, the present invention is not limited thereto and the terminals and the current collecting lead tab may be integrally formed.

A lower insulating member 26 is installed between the terminals 21 and 22 and the cap plate 30, and upper ends of the current collecting lead tabs 40 and 50 and the flanges 21a and 22a of the terminals 21 and 22 are located in the recesses formed on the lower insulating member 26.

Figure 3:
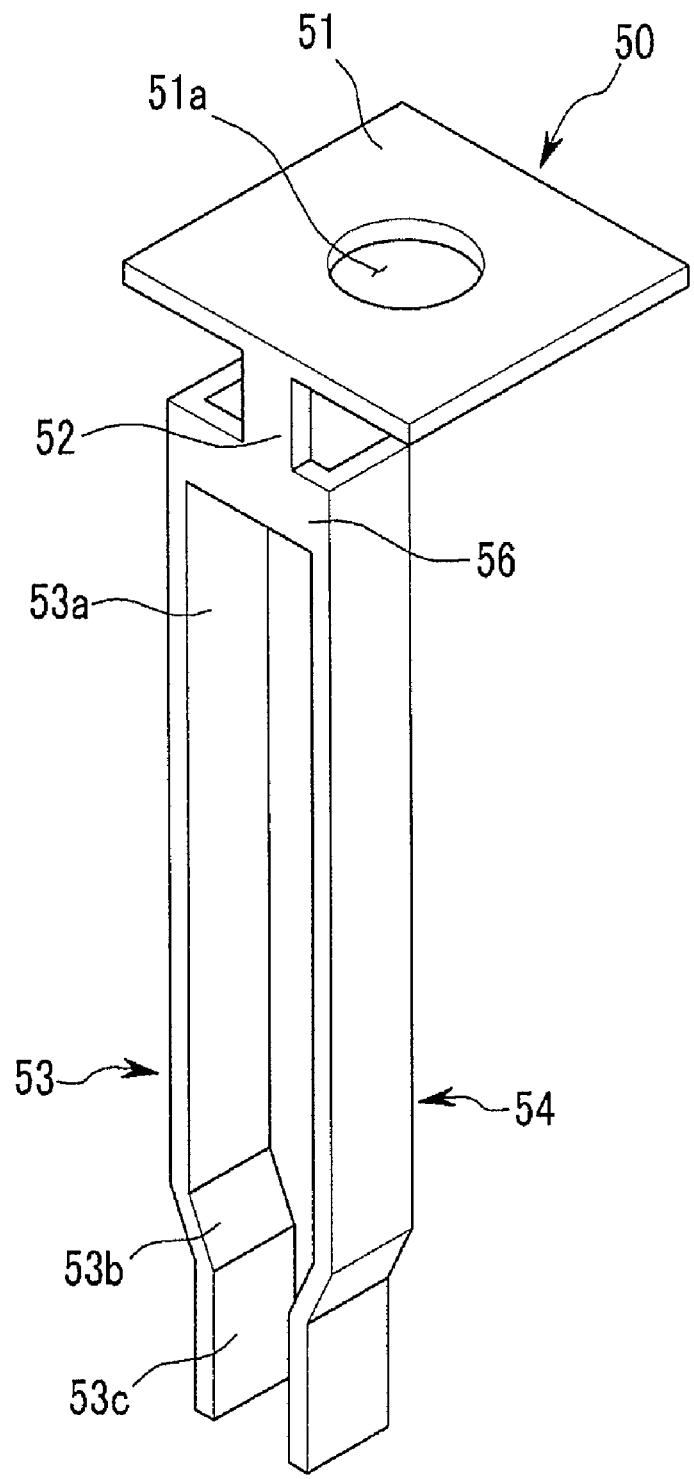
FIG. 3 is a perspective view of a current collecting lead tab according to the first exemplary embodiment of the present invention.
Figure 4:
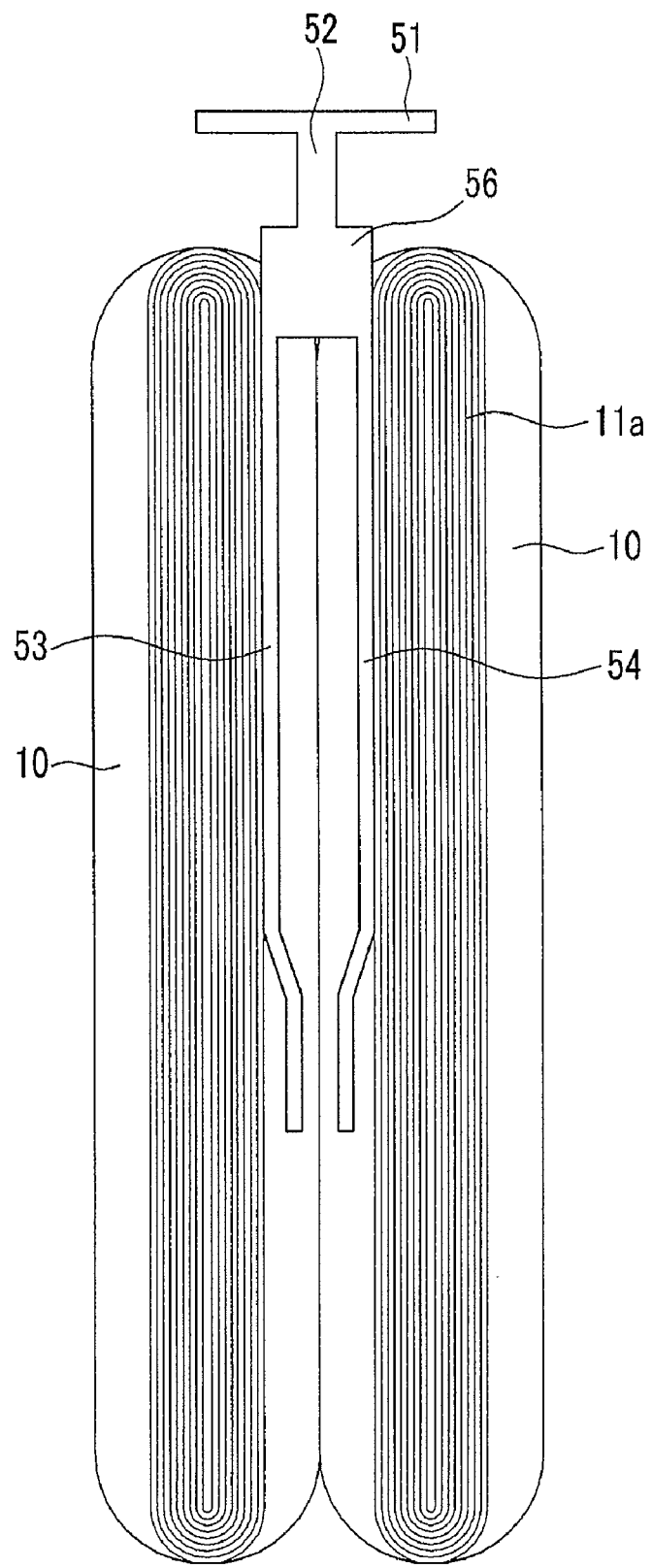
FIG. 4 is a side view showing the current collecting lead tab attached to a plurality of electrode assemblies according to the first exemplary embodiment of the present invention.

FIG. 3 is a perspective view of a current collecting lead tab according to the first exemplary embodiment of the present invention, and FIG. 4 is a side view showing a state that the current collecting lead tab is attached to electrode assemblies according to the first exemplary embodiment of the present invention.

The current collecting lead tabs will now be described in detail with reference to FIGS. 3 and 4.

The negative current collecting lead tab 40 has substantially the same structure as that of the positive current collecting lead tab 50, so only a description of the positive current collecting lead tab 50 will be provided.

The positive current collecting tab 50 includes a terminal junction part 51 fixed to the terminal and a plurality of electrode assembly junction parts or prongs 53 and 54 formed to downwardly extend from the terminal junction part 51 and inserted between the electrode assemblies 10.

A connection plate 52 is formed between the terminal junction part 51 and the prongs 53 and 54, which extends integrally from the terminal junction part 51. The prongs 53 and 54 extend from the connection plate 52 toward the bottom of the case 34, and include a first prong 53 attached through welding to the positive uncoated region 11a of one electrode assembly and a second prong 54 attached through welding to the positive uncoated portion of another electrode assembly.

A terminal hole 51a is formed on the terminal junction part 51, into which the lower protrusion 21b of the positive terminal is inserted. The terminal hole 51a is bonded to a lower portion of the positive terminal 21 through welding. The connection plate 52 is formed to be bent downwardly at substantially a right angle from the terminal junction part 51. A branch portion 56 is formed to extend to an outer side of the connection plate 52 under the connection plate 52. Namely, the branch portion 56 is formed to extend laterally to the outer side further than the both side ends of the connection plate 52 under the connection plate 56. The first prong 53 and the second prong 54 are each formed at one side end of the branch portion 56. The first and second prongs 53 and 54 have a substantially rectangular bar shape and are bent from the connection plate 52 at a right angle toward the electrode assemblies 10. Accordingly, the first and second prongs 53 and 54 are parallel to flat faces of the electrode assemblies 10, and are formed to be parallel to each other.

Because the first and second prongs 53 and 54 are formed to be bent, they are oriented to be parallel to the positive uncoated region 11a so as to be bonded to the positive uncoated region 11a through ultrasonic welding.

The two electrode assemblies overlap each other, and the positive uncoated regions 11a are located at one end of the electrode assemblies 10 and the negative uncoated regions 12a are located at the other end of the electrode assemblies 10. The positive uncoated regions 11a are formed to have a thickness smaller than that of the coated regions, forming a space between the positive uncoated regions 11a. The prongs 53 and 54 are inserted in the space between the positive uncoated regions 11a.

The first prong 53 has substantially the same structure as that of the second prong 54, so only a description of the first prong 53 will be provided.

The first prong 53 includes a welded bar (or main body) 53a installed to be fixed to the branch portion 56, a bent bar (or angled body) 53b bent to an outer side of the electrode assembly, and an insertion tip 53c formed at the end of the angled body 53b. The angled body 53b may be formed to be sloped or angled from the main body 53a toward the outer side from (i.e., away from) the center of the electrode assembly 10 where the main body 53a is attached, and in this case, the angled body 53b may be formed to be sloped at 5 degrees to 90 degrees. The insertion tip 53c is formed at the end of the bent portion 53b and is separated from (i.e., spaced from) the positive uncoated region 11a. Accordingly, the space between the two facing insertion tips is smaller than the space between the facing main bodies.

In one embodiment, the insertion tip 53c is positioned in a space between the electrode assemblies 10 such that the facing insertion tips 53c are not in contact with each other.

Thus, when the positive current collecting lead tab 50 is inserted between the electrode assemblies 10, the insertion tips 53c are spaced from the positive uncoated region 11a. Thus, the current collecting lead tab 50 can be easily inserted without damaging the positive uncoated region 11a. In addition, although the main body 53a is designed to be tightly attached to the positive uncoated region 11a, thereby applying pressurize to the positive uncoated region 11a, because the insertion tip 53c is inserted to be spaced from the positive uncoated region 11a, the current collecting lead tab 50 can be easily inserted. In this manner, because the positive current collecting lead tab 53 is installed such that the main body 53c pressurizes the positive uncoated region 11a, the main body 53a and the positive uncoated region 11a are tightly attached to prevent or significantly reduce the occurrence of a defective contact between the positive current collecting lead tab 53 and the positive uncoated region 11a due to an external impact or vibration.

Figure 5:
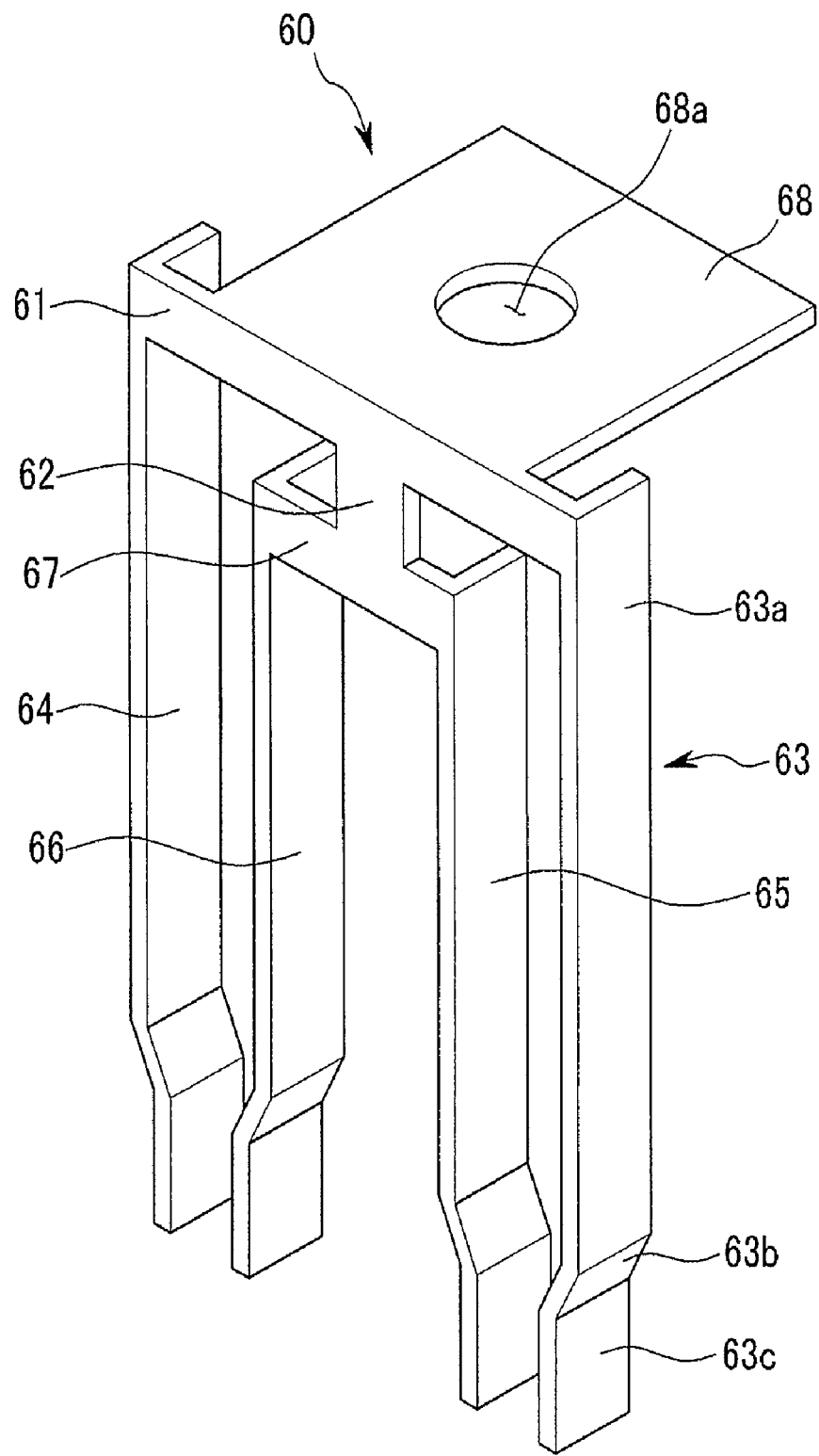
FIG. 5 is a perspective view of a current collecting lead tab according to a second exemplary embodiment of the present invention.
Figure 6:
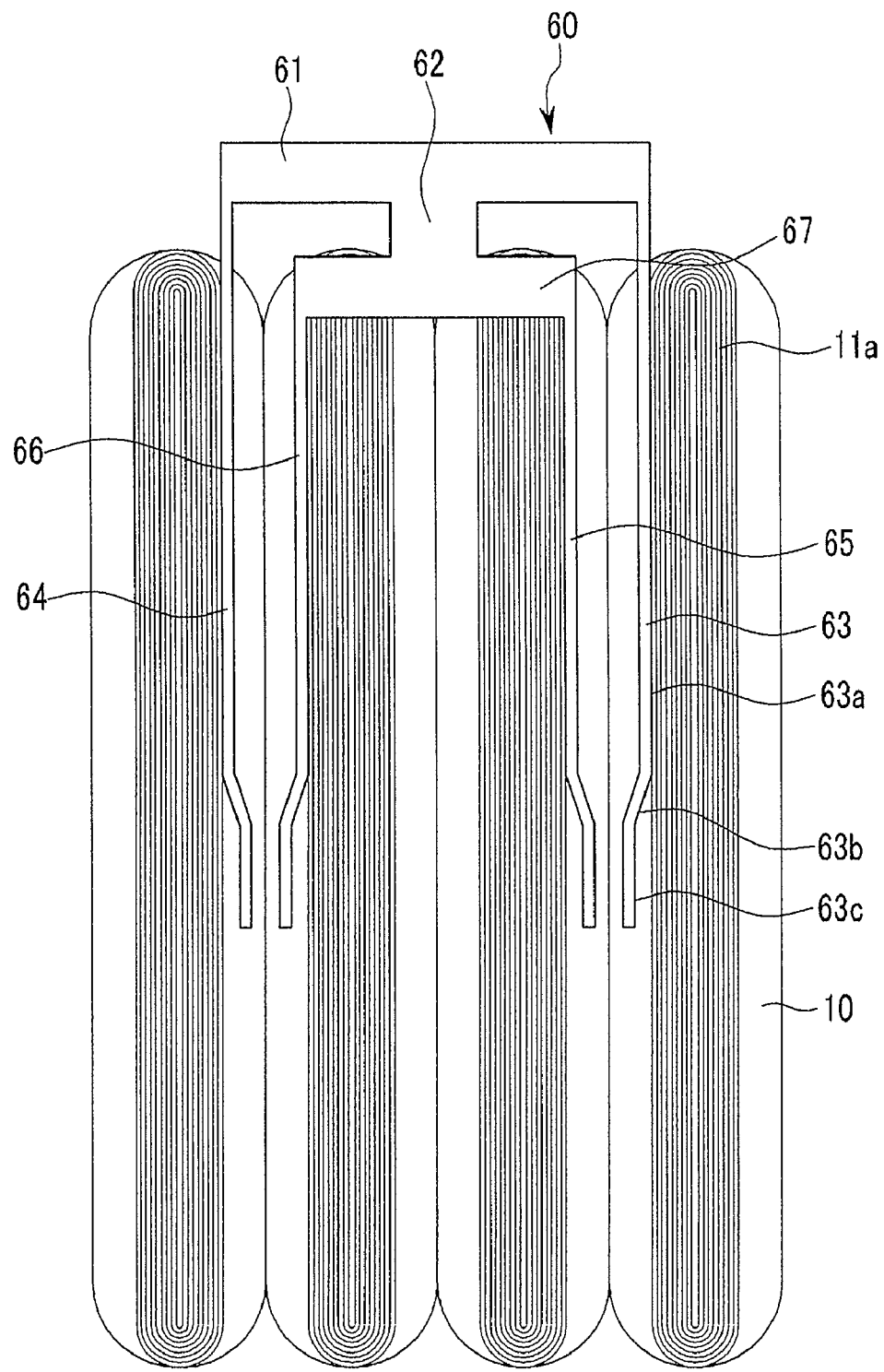
FIG. 6 is a side view showing a current collecting lead tab attached to electrode assemblies according to the second exemplary embodiment of the present invention.

FIG. 5 is a perspective view of a current collecting lead tab according to a second exemplary embodiment of the present invention, and FIG. 6 is a side view showing a state that the current collecting lead tab is attached to electrode assemblies according to the second exemplary embodiment of the present invention.

With reference to FIGS. 5 and 6, a current collecting lead tab 60 includes a terminal junction part 68 fixed to the terminal and a plurality of prongs 63, 64, 65, and 66 formed to downwardly extend from the terminal junction part 68 and configured to be inserted between the electrode assemblies 10.

The rechargeable battery according to the present exemplary embodiment includes four electrode assemblies 10, and the four electrode assemblies 10 are stacked and arranged to be parallel to each other.

The prongs 63, 64, 65, and 66 include a first prong 63, a second prong 64, a third prong 65, and a fourth prong 66. The four prongs 63, 64, 65, and 66 are oriented to be parallel to each other.

The terminal junction part 68 has a plate-like shape, is parallel to the cap plate, and includes a terminal hole 68a formed at the center thereof. A lower protrusion of the terminal is inserted into the terminal hole 68a.

A first branch portion 61 is formed under the terminal junction part 68 to protrude to an outer side further than the side ends of the terminal junction part 68. The first branch portion 61 is formed to be bent toward the bottom from the terminal junction part 68. The first and second prongs 63 and 64 are formed to be bent from both side ends of the first branch portion 61. The first and second prongs 63 and 64 are bent toward the center of the electrode assemblies 10 and extend from the first branch portion 61 toward the lower end of the electrode assemblies 10.

A connection plate 62 is formed to be continued from the first branch portion 61 toward the bottom of the case, and a second branch portion 67 is formed to be protruded to an outer side further than the side ends of the connection plate 62 under the connection plate 62. The third and fourth prongs 65 and 66 are formed at both side ends of the second branch portion 67. The third and fourth prongs 65 and 66 are bent toward the center of the electrode assemblies 10, and continued from the second branch portion 67 toward the lower end of the electrode assemblies 10.

The connection plate 62 is located between the first and second electrode junction parts 63 and 64, and accordingly, the third and fourth prongs 65 and 66 are located between the first and second prongs 63 and 64.

Because the prongs 63, 64, 65, and 66 are formed to be bent, they are formed to be parallel to each other and oriented to be parallel to the positive uncoated region 11a so as to be bonded to the positive uncoated region 11a through ultrasonic welding.

The four electrode assemblies 10 are disposed to overlap with each other, and the uncoated region is formed at both ends of the electrode assemblies 10. The positive uncoated regions 11a are formed to have a thickness less than a thickness of the coated regions, thereby forming a space between the positive uncoated regions 11a, and the prongs 53 and 54 are inserted in the space.

The first and third electrode junction parts 63 and 65 are inserted in a space between positive uncoated regions 11a positioned at one edge, and the second and fourth prongs 64 and 66 are inserted in a space between the positive uncoated regions 11a positioned at the other edge.

The first and second prongs 63 and 64 have substantially the same shape, and the third and fourth junction parts 65 and 66 have substantially the same shape as that of the first and second prongs 63 and 64, except that they are shorter. In one embodiment, the lower ends of the first and second prongs 63 and 64 are positioned at the same region as that of the lower ends of the third and fourth prongs 65 and 66.

Since all of the prongs 63, 64, 65, 66 have substantially the same shape, only a description of the first prong 63 will be provided.

The first prong 63 includes a main body 63a, an angled body 63b bent toward the boundary between the electrode assemblies so as to be sloped toward the center of the electrode assemblies, and an insertion tip 63c formed at the end of the angled body 63b. The angled body 63b is formed to be sloped with respect to the main body 63a, allowing the insertion tip 63c to be spaced from the positive uncoated region 11a, and accordingly, the prongs 63, 65, 65, and 66 can be easily inserted between the electrode assemblies 10.

Also, although the main body 63a is formed to be tightly attached to the positive uncoated region 11a, because the insertion tip 63c is spaced from the positive uncoated region 11a, the current collecting lead tab 60 can be easily inserted between the positive uncoated regions 11a while still allowing the main body 63a to be attached to the positive uncoated region 11a.

In this manner, according to the present exemplary embodiment, the four electrode assemblies 10 and the positive terminal 21 can be electrically connected by using the single current collecting lead tab 60, and accordingly, the current collecting lead tab 60 can be easily installed and assembled, improving the productivity. Also, because current collected at the respective electrode assemblies 10 is transferred to the terminal through different paths, the current can be stably transferred without bottlenecking. Thus, an increase in resistance otherwise caused by a current concentration at the current collecting lead tab 60 can be prevented.

Figure 7:
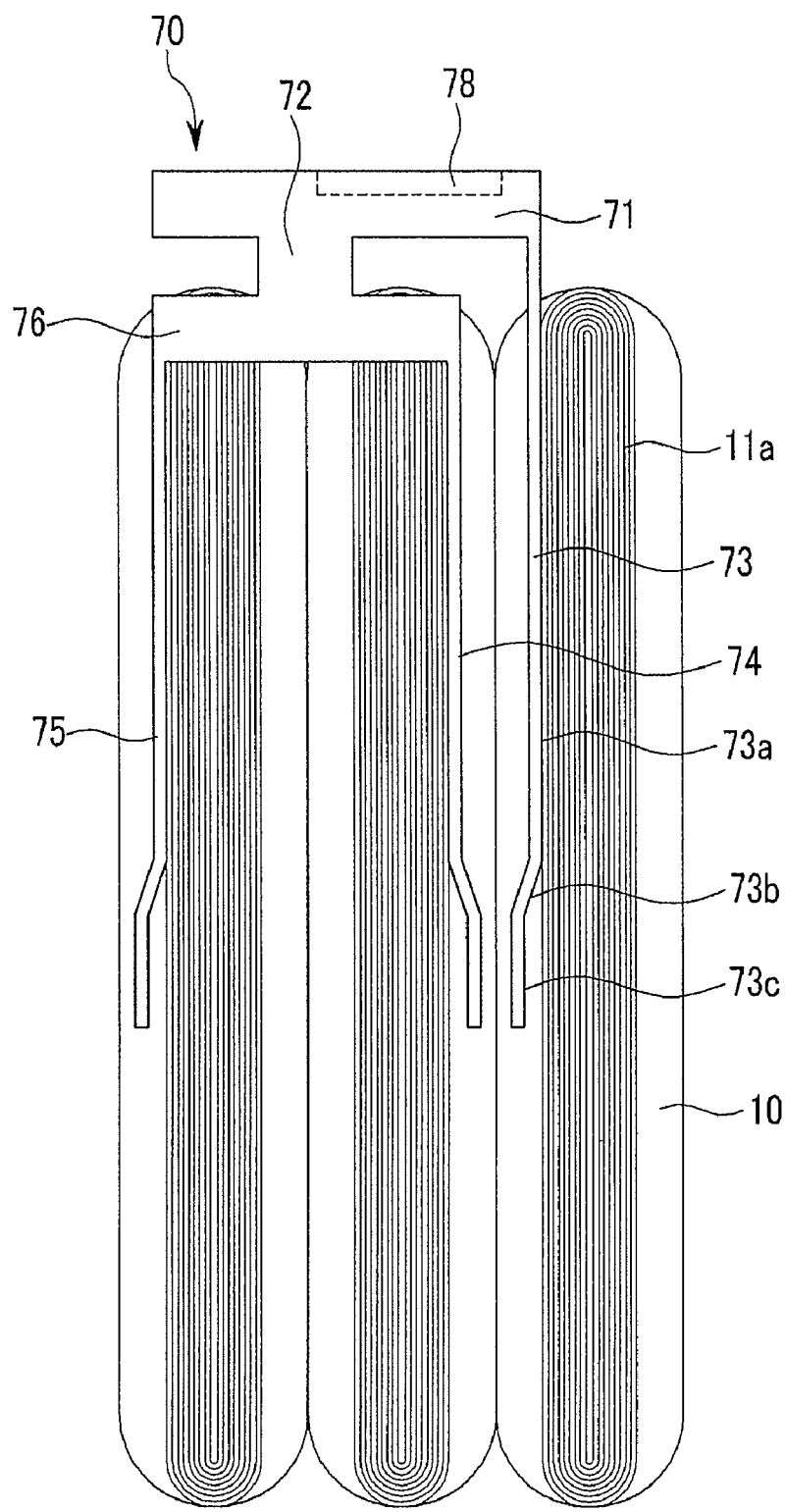
FIG. 7 is a side view showing a current collecting lead tab installed on a plurality of electrode assemblies according to a third exemplary embodiment of the present invention.

FIG. 7 is a side view showing a current collecting lead tab installed between electrode assemblies according to a third exemplary embodiment of the present invention.

With reference to FIG. 7, a current collecting lead tab 70 according to the present exemplary embodiment includes a terminal junction part 78 attached to the terminal through welding and a plurality of prongs 73, 74, and 75 formed to be continued downwardly from the terminal junction part 78 and inserted between the electrode assemblies 10.

A rechargeable battery according to the present exemplary embodiment includes three electrode assemblies 10, and the three electrode assemblies are stacked and arranged to be parallel to each other.

The terminal junction part 78 is formed to be substantially parallel to the cap plate and fixed to the lower end of the terminal through welding. The prongs include first, second and third prongs 73, 74, and 75 oriented substantially parallel to each other. A first branch portion 71 formed to protrude from an outer side further than the side end of the terminal junction part 78 under the terminal junction part 78. The first branch portion 71 is bent from the terminal junction part 78 toward the bottom of the case.

The first prong 73 is formed to be bent from one side end of the first branch portion 71. The first prong 73 is bent from the side end of the first branch portion 71 at a right angle, and formed to be parallel to a flat face of the electrode assembly 10.

A connection plate 72 is formed to be downwardly continued from the first branch portion 71 toward the bottom of the case, and a second branch portion 76 is formed under the connection plate 72 to protrude to an outer side further than the side end of the connection plate 72. The second and third prongs 74 and 75 are formed at both side ends of the second branch portion 76 and are bent from the second branch portion 76 at a right angle so as to be substantially parallel to the flat faces of the electrode assemblies 10, and are formed to be continued from the second branch portion 76 toward the lower ends of the electrode assemblies 10.

The first prong 73 has substantially the same configuration as that of second and third prongs 74 and 75, except that it is longer than the second and third prongs 74 and 75. The lower end of the first prong 73 is positioned at substantially the same region or relative height as that of the lower ends of the second and third prongs 74 and 75.

When the respective prongs 73, 74, and 75 are formed to be bent, they are oriented to be substantially parallel to the positive uncoated regions 11a of the electrode assemblies 10 and bonded to the positive uncoated regions 11a through ultrasonic welding.

The three electrode assemblies 10 are oriented to overlap with each other, and a space is formed between the positive uncoated regions 11a. In this case, because three electrode assemblies 10 are disposed to overlap with each other, two spaces are formed. The first and second prongs 73 and 74 are inserted into one space, and the third prong 75 is bonded to an outer surface of the positive uncoated region 11a of the electrode assembly 10 located at the outer side.

The first prong 73 includes a main body 73 attached to the positive uncoated region 11a through welding, an angled body 73b formed to be bent to an outer side of the electrode assembly 10, and an insertion tip 73c formed at the end of the angled body 73. Accordingly, the current collecting lead tab 70 can be easily inserted between the electrode assemblies.

Figure 8:
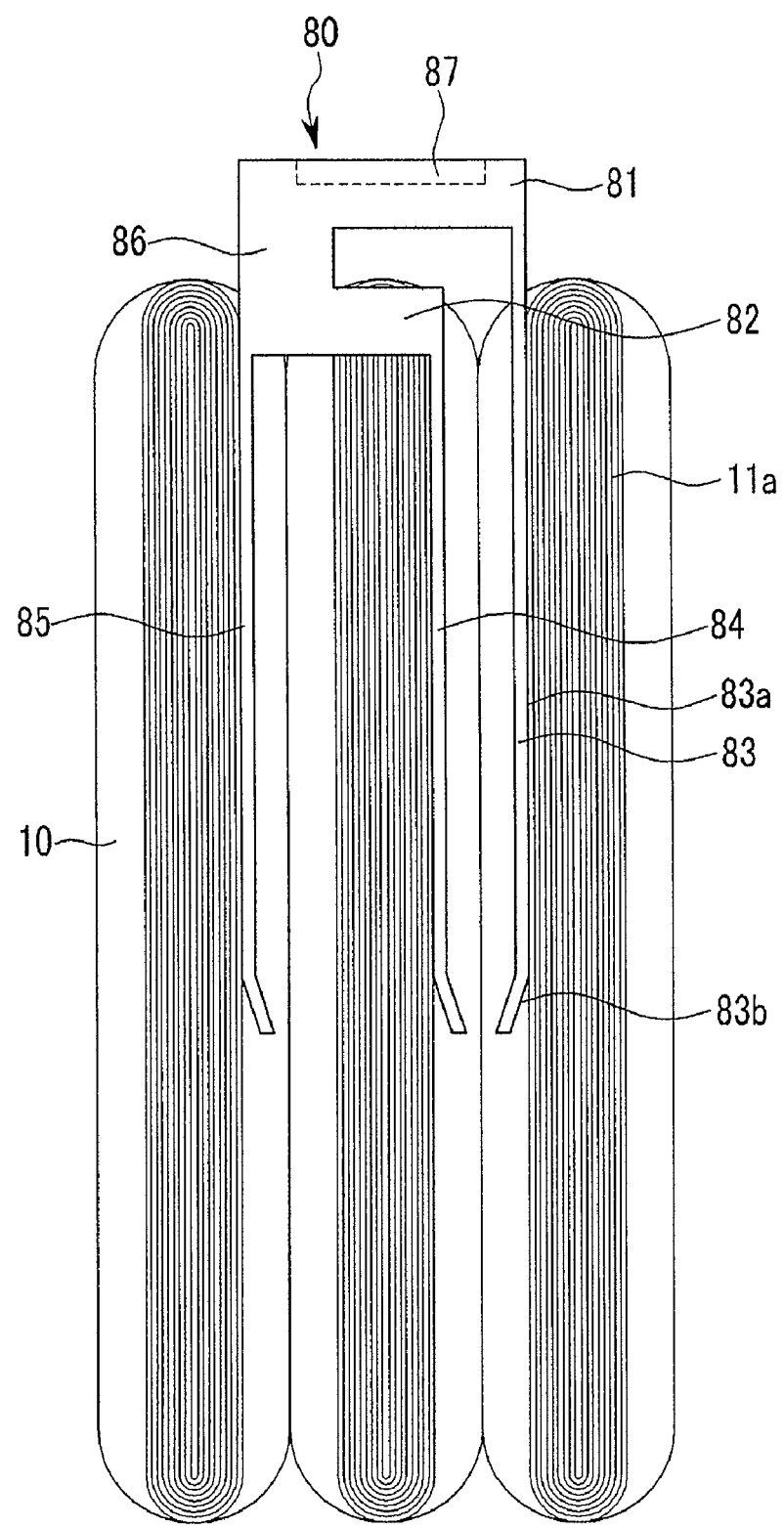
FIG. 8 is a side view showing a current collecting lead tab installed on electrode assemblies according to a fourth exemplary embodiment of the present invention.

FIG. 8 is a side view showing a state that a current collecting lead tab is installed at electrode assemblies according to a fourth exemplary embodiment of the present invention.

With reference to FIG. 8, the current collecting lead tab 80 according to the present exemplary embodiment includes a terminal junction part 87 attached to the terminal through welding and a plurality of prongs 83, 84, and 85 formed to be downwardly continued from the terminal junction part 87 and inserted between the electrode assemblies 10.

A rechargeable battery according to the present exemplary embodiment includes three electrode assemblies 10, and the three electrode assemblies 10 are stacked and arranged in parallel.

The terminal junction part 87 is formed to be parallel to the cap plate and fixed to a lower end of the terminal through welding. The prongs include first, second, and third prongs 83, 84, and 85, oriented in parallel. A first branch portion 81 is formed to protrude to an outer side further than the side end of the terminal junction part 87 under the terminal junction part 87. The first branch portion 81 is bent from the terminal junction part 87 toward the bottom of the case.

The first prong 83 is formed to be bent from one side end of the first branch portion 81, and the third prong 85 is formed to be bent from the other side end of the first branch portion 81.

The first and third prongs 83 and 85 are bent from the side ends of the first branch portion 81, and are formed to be parallel to the flat faces of the electrode assemblies 10.

A connection plate 86 is formed to be downwardly continued toward the bottom of the case under the first branch portion 81, and a second branch portion 82 is formed under the connection plate 86 to protrude to an outer side further than one end of the connection plate 86. The second prong 84 is formed at one side end of the second branch portion 82.

Because the three electrode assemblies 10 overlap with each other, two spaces are formed between the positive uncoated regions 11a. The first and second prongs 83 and 84 are inserted into one space, and the third prong 85 is inserted into the other space.

The first prong 83 includes a main body 83a attached to the positive uncoated region 11a through welding and having a rectangular bar shape and an angled body 83b formed to be bent to an outer side of the electrode assembly 10 from a lower portion of the main body 83. The angled body 83b is formed to be sloped with respect to the main body 83a, and a lower end of the angled body 83b is separated from the electrode assembly 10. Accordingly, the current collecting lead tab 80 can be easily inserted between the electrode assemblies 10.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
   a plurality of electrode assemblies;
   a case housing the electrode assemblies;
   at least one electrode terminal electrically connected to the electrode assemblies by a lead tab, the lead tab comprising:
      a terminal junction part; and
      a prong portion extending from the terminal junction part, the prong portion comprising a plurality of prongs, each of the prongs having a main body electrically connected to one of the electrode assemblies, an angled body extending at an angle from the main body, and an insertion tip extending from the angled body in a direction substantially parallel to the main body and spaced from the one of the electrode assemblies.

2. The rechargeable battery of claim 1, wherein the terminal junction part has a terminal opening through which the at least one electrode terminal extends.

3. The rechargeable battery of claim 1, wherein a connection plate extends from an edge of the terminal junction part and wherein the prong portion extends from the connection plate.

4. The rechargeable battery of claim 1, wherein the prong portion further comprises a first branch plate extending from the terminal junction part, wherein at least one of the prongs extends from the first branch plate.

5. The rechargeable battery of claim 4, further comprising a second branch plate extending from the terminal junction part, wherein at least one of the prongs extends therefrom.

6. The rechargeable battery of claim 1, wherein the main bodies of each of the prongs extend in a direction substantially parallel to each other.

7. The rechargeable battery of claim 1, wherein the main body of each of the prongs is substantially rectangular.

8. The rechargeable battery of claim 1, wherein the angled body is bent at an angle in a direction away from the one of the electrode assemblies to which the main body is connected.

9. The rechargeable battery of claim 1, wherein the angled body is bent at an angle between about 5 degrees and about 90 degrees.

10. The rechargeable battery of claim 1, wherein each of the electrode assemblies has an uncoated region not coated with an active material and wherein the main body of each of the prongs is attached to the uncoated region of one of the electrode assemblies.

11. The rechargeable battery of claim 1, wherein the lead tab is configured to electrically connect at least three electrode assemblies to the electrode terminal.

12. The rechargeable battery of claim 1, wherein the main body is welded to the one of the electrode assemblies.

13. The rechargeable battery of claim 1, further comprising at least one additional electrode terminal and wherein one additional lead tab is electrically connected to the at least one additional electrode terminal.

14. The rechargeable battery of claim 1, wherein the rechargeable battery is configured to be used as a power source for driving a motor for an electric vehicle.

15. The rechargeable battery of claim 1, wherein a distance between the main bodies of a pair of the plurality of prongs is greater than a distance between the insertion tips of the pair of the plurality of prongs.

16. The rechargeable battery of claim 3, wherein the connection plate extends from the terminal junction part at an angle.

* * * * *

UNITED STATES PATENT AND TRADEMARK OFFICE
CERTIFICATE OF CORRECTION

PATENT NO. : 8,232,000 B2  Page 1 of 1
APPLICATION NO. : 12/837212
DATED : July 31, 2012
INVENTOR(S) : Sang-Won Byun et al.

It is certified that error appears in the above-identified patent and that said Letters Patent is hereby corrected as shown below:

On the Title Page

Item (56) References Cited, FOREIGN       Delete "KR 10-2009-00811973"

PATENT DOCUMENTS, line 6                  Insert -- KR 10-2009-0081197 --

Signed and Sealed this
First Day of July, 2014

Michelle K. Lee
*Deputy Director of the United States Patent and Trademark Office*